(12) United States Patent
Steinberg (10) Patent No.: US 7,373,955 B2
(45) Date of Patent: *May 20, 2008

(54) MODULAR MANIFOLD

(75) Inventor: Ron Steinberg, Huntington Beach, CA (US)

(73) Assignee: MICAD Marine Systems, LLC, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/655,364

(22) Filed: Jan. 19, 2007

(65) Prior Publication Data

US 2007/0113909 A1    May 24, 2007

Related U.S. Application Data

(63) Continuation of application No. 11/147,104, filed on Jun. 7, 2005, now Pat. No. 7,204,272.

(51) Int. Cl.
*F16K 27/00* (2006.01)

(52) U.S. Cl. .................... 137/884; 285/125.1
(58) Field of Classification Search ............ 137/269, 137/270, 271, 561 A, 884; 285/125.1, 133.11, 285/133.21
See application file for complete search history.

(56) References Cited

U.S. PATENT DOCUMENTS

| | | | |
|---|---|---|---|
| 3,025,878 A | 3/1962 | Hupp | |
| 3,219,053 A | 11/1965 | Hupp | |
| 3,486,519 A | 12/1969 | Olson | |
| 3,509,904 A | 5/1970 | Olson | |
| 3,513,876 A | 5/1970 | Tarbox | |
| 3,589,387 A | 6/1971 | Raymond | |
| 3,915,194 A | 10/1975 | Friedrich | |
| 3,934,605 A | 1/1976 | Legris | |
| 4,230,143 A | 10/1980 | Dettmann et al. | |
| 4,848,405 A | 7/1989 | Albrecht | |
| 4,938,509 A | 7/1990 | LaPlante | |
| 5,050,631 A | 9/1991 | Konno et al. | |
| 5,462,087 A | 10/1995 | Fukano et al. | |
| 5,474,102 A | 12/1995 | Lopez | |
| D368,298 S | 3/1996 | Miller et al. | |
| 5,860,676 A | 1/1999 | Brzezicki et al. | |
| 5,944,056 A | 8/1999 | Miyazoe et al. | |
| 5,992,894 A | 11/1999 | Eybergen | |
| 6,619,321 B2 | 9/2003 | Reid, II et al. | |
| 6,763,848 B2 | 7/2004 | Rondreux et al. | |
| 6,776,193 B2 | 8/2004 | Eidsmore | |
| 6,871,576 B2 | 3/2005 | Vari | |
| 6,951,226 B2 | 10/2005 | Eriksson et al. | |
| 2003/0116208 A1 | 6/2003 | Eriksson et al. | |

*Primary Examiner*—John Fox
(74) *Attorney, Agent, or Firm*—Cislo & Thomas, LLP (57) ABSTRACT

A modular manifold includes a first pair of adjoining port modules configured with a first internal channel adapted for fluid flow and two side ports arranged on top of each other. A front cap is operatively coupled to one side of the first pair of adjoining port modules. The front cap provides threaded access to the first internal channel. A second pair of adjoining port modules is operatively coupled to another side of the first pair of adjoining port modules. The second pair of adjoining port modules has a second internal channel adapted for fluid flow and two side ports arranged on top of each other. The first and second internal channels define a common manifold channel. The side ports are aligned in a linear fashion. An end cap is operatively coupled to the second pair of adjoining port modules and configured to seal the common manifold channel.

10 Claims, 6 Drawing Sheets

MODULAR MANIFOLD

CROSS-REFERENCE TO RELATED APPLICATIONS

This utility patent application is a continuation of U.S. Utility patent application Ser. No. 11/147,104, filed on Jun. 7, 2005 now U.S. Pat. No. 7,204,272 and published on Dec. 7, 2006 under US 2006/0272719 A1, the entire disclosure of which is incorporated herein by reference.

BACKGROUND

The idea of welding together a stainless steel tube with ½ inch ports on it—one tube portion for fill, and another tube portion for drain—every time one needs to build a manifold is time consuming and costly. Using strong polyethylene doughnut pieces, whereby each one is provided with a side access port, to quickly and easily build a modular manifold would be a much better solution. Most known modular setups lack side access to build manifolds, and, in fact are designed for an entirely different purpose, namely to connect PVC and/or metal pipes, not to create manifolds. The need arises, therefore, for a modular manifold that can be easily and securely assembled and that can provide multiple side ports by increasing or reducing the number of doughnut pieces being used, as needed.

SUMMARY

Exemplary embodiments disclosed herein are generally directed to a modular manifold.

In accordance with one aspect of the invention, the modular manifold includes a first pair of adjoining port modules configured with a first internal channel adapted for fluid flow and two side ports arranged on top of each other. The side ports are in fluid communication with the first internal channel. A front cap is operatively coupled to one side of the first pair of adjoining port modules. The front cap provides threaded access to the first internal channel.

A second pair of adjoining port modules is operatively coupled to another side of the first pair of adjoining port modules. The second pair of adjoining port modules is configured with a second internal channel adapted for fluid flow and two side ports arranged on top of each other. The side ports are in fluid communication with the second internal channel.

The first and second internal channels define a common manifold channel. The four side ports are aligned substantially in a linear fashion. An end cap is operatively coupled to the second pair of adjoining port modules and configured to seal the common manifold channel.

These and other aspects of the invention will become apparent from a review of the accompanying drawings and the following detailed description of the invention.

BRIEF DESCRIPTION OF THE DRAWINGS

The present invention is generally shown by way of reference to the accompanying drawings in which.

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, it is to be understood that the same or equivalent functions and sequences may be accomplished by different embodiments that are also intended to be encompassed within the spirit and scope of the present invention.

Some embodiments of the present invention will be described in detail with reference to a modular manifold, as generally shown in FIGS. 1-12. Additional embodiments, features and/or advantages of the invention will become apparent from the ensuing description or may be learned by practicing the invention. In the figures, the drawings are not to scale with like numerals referring to like features throughout both the drawings and the description.

Figure 1:
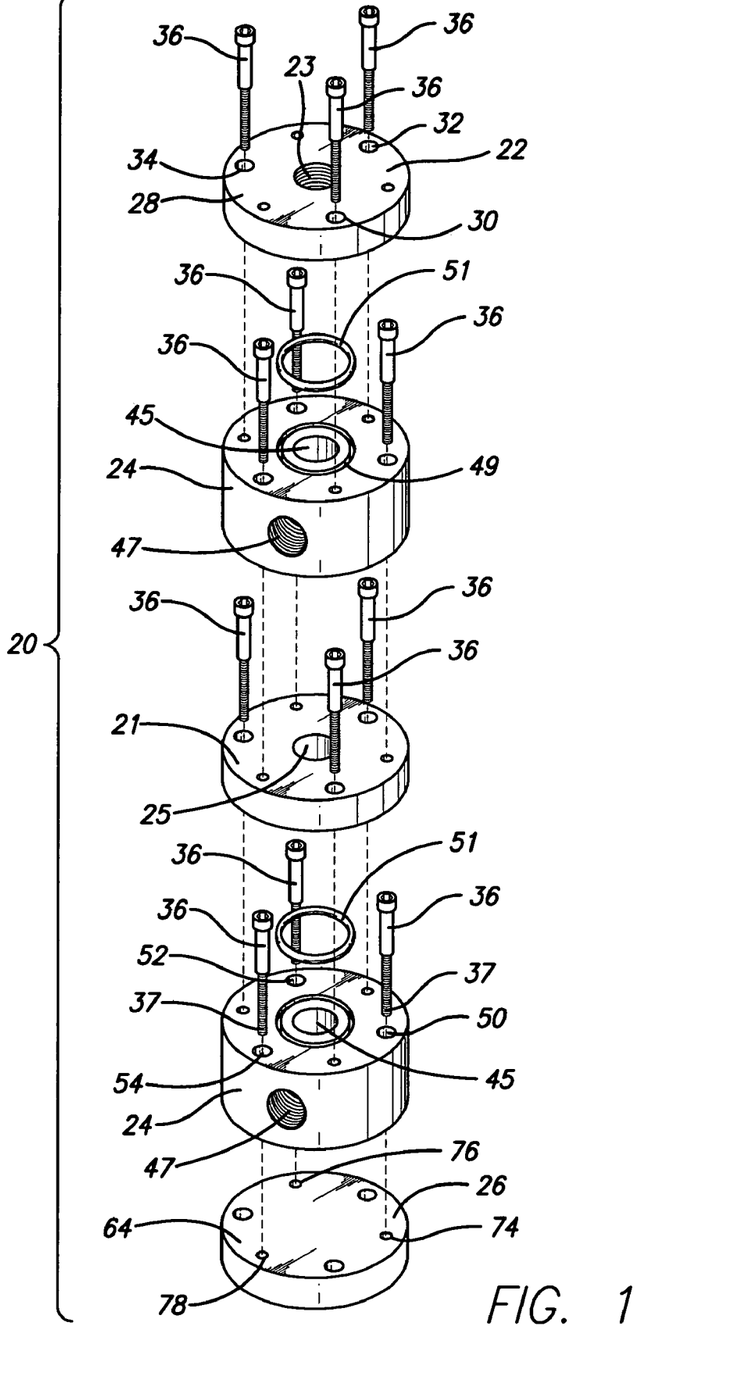
FIG. 1 is an exploded perspective view of components that may be used to construct a modular manifold in accordance with an exemplary embodiment of the present invention.

FIG. 1 is an exploded perspective view of components that may be used to assemble a modular manifold 20 in accordance with an exemplary embodiment of the present invention. Modular manifold 20 provides two NPT (National Pipe Taper) threaded side ports for making fluid connections to mechanical and/or electromechanical systems. Modular manifold 20 is terminated with NPT threaded access to a common manifold channel that is in communication with the side ports. The number of side ports may be varied by adding or subtracting manifold components, as needed. Specifically, modular manifold 20 is assembled from a front cap 22 (FIGS. 2-3), a spacer 21 (FIG. 1), two port modules 24 (FIGS. 4-5), and an end cap 26 (FIGS. 6-7), as generally illustrated in reference to FIG. 1.

Front cap 22, which is of a generally tubular configuration, terminates modular manifold 20 with NPT threaded access 23 (FIGS. 1-3) to a common manifold channel (FIG. 1). Top surface 28 of front cap 22 includes three countersunk apertures 30, 32, 34 (FIG. 2) with each countersunk aperture being adapted to receive the head of a long screw 36 (FIG.

1). A countersunk aperture suitable for practicing the present invention is shown, for example, in cross-section in reference to FIG. 8.

Figure 3:
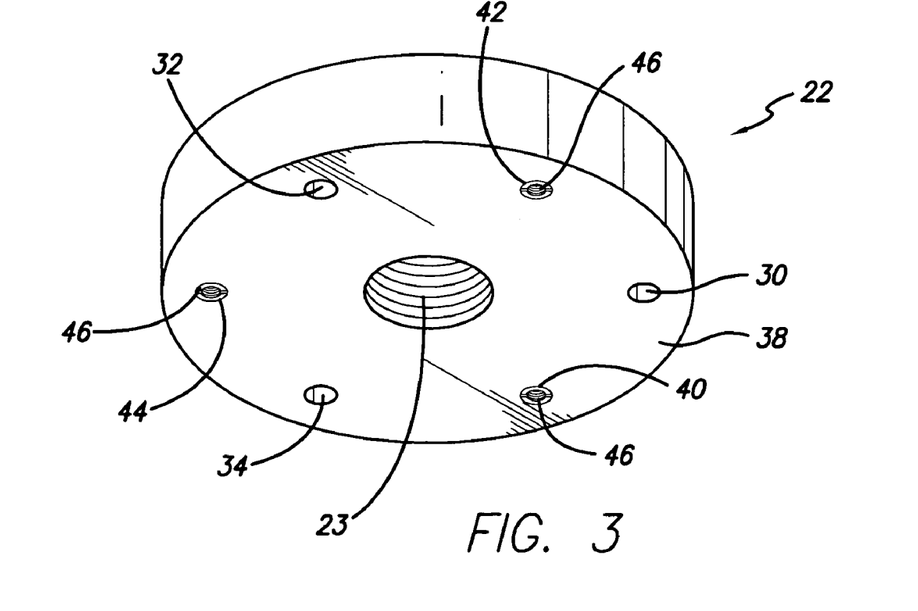
FIG. 3 is a bottom perspective view of the front cap of FIG. 2.
Figure 4:
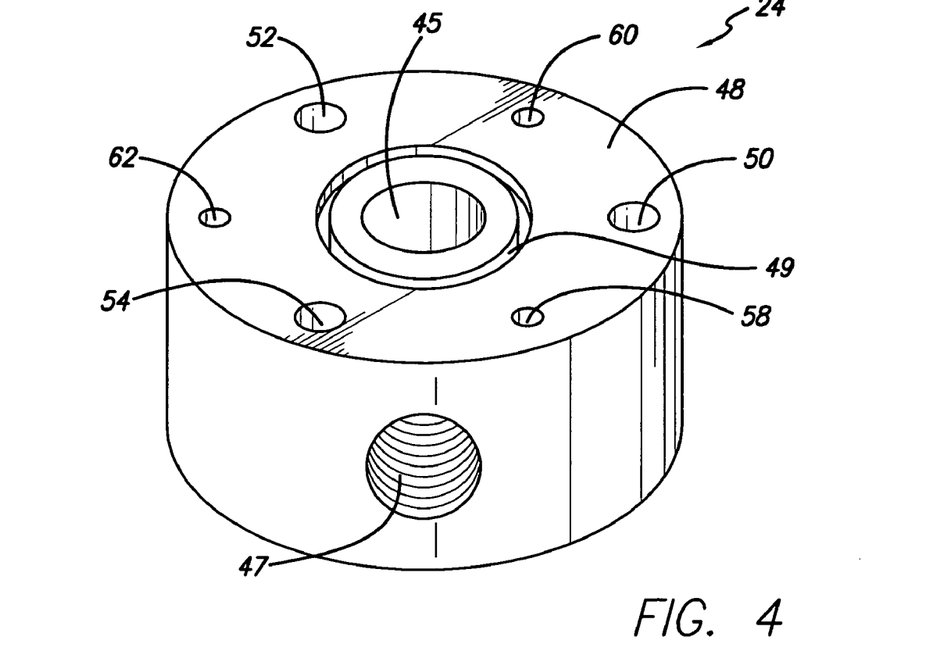
FIG. 4 is a top perspective view of a port module being utilized as a modular manifold component, as generally shown in FIG. 1.

Bottom surface 38 of front cap 22 also includes three countersunk apertures, namely apertures 40, 42 and 44 (FIG. 3). A threaded female fastener 46 is embedded in each of countersunk apertures 40, 42, 44, as generally illustrated in FIG. 3. Embedded fastener 46 may lie flush with or somewhat below bottom surface 38. Embedded fastener 46 is adapted to mate with terminal end 37 of long screw 36 during assembly of modular manifold 20 (FIG. 1). A bottom surface countersunk aperture with an embedded threaded fastener suitable for practicing the present invention is shown, for example, in cross-section in reference to FIG. 9. In this example, the threaded fastener is shown embedded somewhat below the bottom surface of end cap 26.

Figure 2:
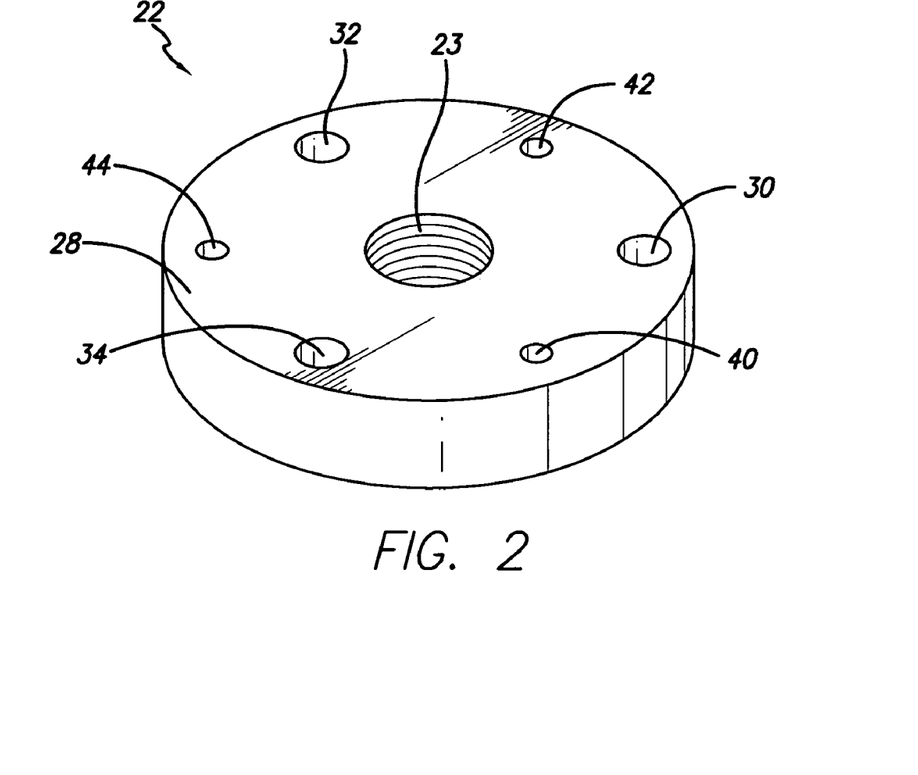
FIG. 2 is a top perspective view of a front cap being utilized as a modular manifold component, as generally shown in FIG. 1.

The narrow portion of each top countersunk aperture (30, 32, 34) terminates on bottom surface 38 between two respective neighboring bottom countersunk apertures (40, 42, 44), as generally shown in FIG. 3. Similarly, the narrow portion of each bottom countersunk aperture (40, 42, 54) terminates on top surface 28 between two respective neighboring top countersunk apertures (30, 32, 34), as generally shown in FIG. 2. The narrow portion of a countersunk aperture suitable for practicing the present invention is shown, for example, in cross-section in reference to FIG. 8. For example, the terminal end of bottom countersunk aperture 40 is disposed on top surface 28 between top countersunk apertures 30 and 34 (FIG. 2). In the same manner, the terminal end of top countersunk aperture 30 is disposed on bottom surface 38 between bottom countersunk apertures 40 and 42 (FIG. 3).

Port module 24 is of a generally tubular configuration providing one NPT threaded side port 47 that is in communication with a central channel 45 (FIGS. 1, 4-5) adapted for fluid flow. Central channel 45 is of a generally cylindrical configuration. Side port 47 permits one pipe, hose or valve to access the common manifold channel, which is defined in part by central channel 45 (FIG. 1). Top surface 48 of port module 24 includes three countersunk apertures 50, 52, 54 (FIG. 4) with each countersunk aperture being adapted to receive the head of long screw 36 (FIG. 1). Top surface 48 also includes a circular groove 49 adapted to receive an O-ring 51 (FIG. 1). O-ring 51 is covered with suitable sealing grease and placed in groove 49 to help seal top surface 48 to a respective bottom surface of an adjoining manifold component during assembly of modular manifold 20.

Figure 5:
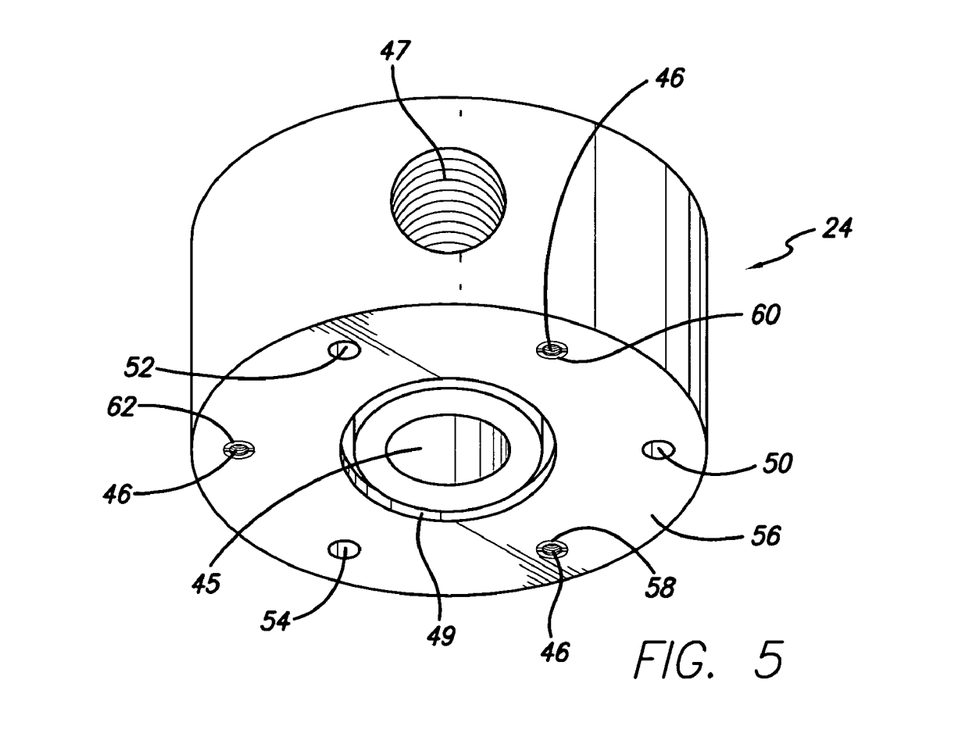
FIG. 5 is a bottom perspective view of the port module of FIG. 4.
Figure 6:
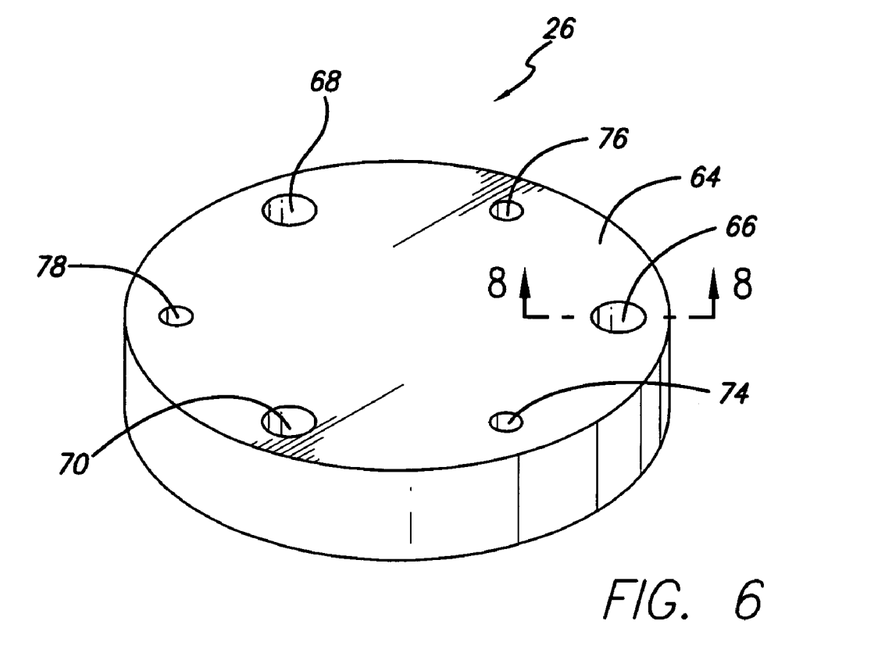
FIG. 6 is a top perspective view of an end cap being utilized as a modular manifold component, as generally shown in FIG. 1.

Bottom surface 56 of port module 24 also includes three countersunk apertures, namely apertures 58, 60 and 62 (FIG. 5). Threaded female fastener 46 is embedded in each of countersunk apertures 58, 60, 62, as generally illustrated in FIG. 5. Embedded fastener 46 may lie flush with or somewhat below bottom surface 56. Bottom surface 56 includes an identical groove 49 adapted to receive O-ring 51, which is covered with sealing grease prior to being placed therein. O-ring 51 helps seal bottom surface 56 to a respective top surface of an adjoining manifold component during assembly of modular manifold 20. The alternating aperture arrangement on each surface (top and bottom) is accomplished generally in the manner described hereinabove in reference to FIGS. 2-3.

Spacer 21 is configured generally as front cap 22 except that NPT threaded access 23 has been replaced by a central channel 25 (FIG. 1) which is part of the common manifold channel. The common manifold channel is further defined by central channels 45 of port modules 24 of FIG. 1. The common manifold channel is in communication with side ports 47, which are aligned substantially in a linear fashion. Central channel 25 is adapted for fluid flow and is substantially cylindrical with a diameter that matches the diameter of central channel 45 of port module 24.

Spacer 21 is sandwiched between port modules 24 during assembly of modular manifold 20. The thickness of spacer 21 may be varied, as desired. Spacer 21 may be utilized, for example, when direct electromechanical valve/manifold connections are desired. The provision of spacer 21 in modular manifold 20 increases the separation between the side ports and permits units to be installed next to each other with appropriate clearance between valves.

Figure 7:
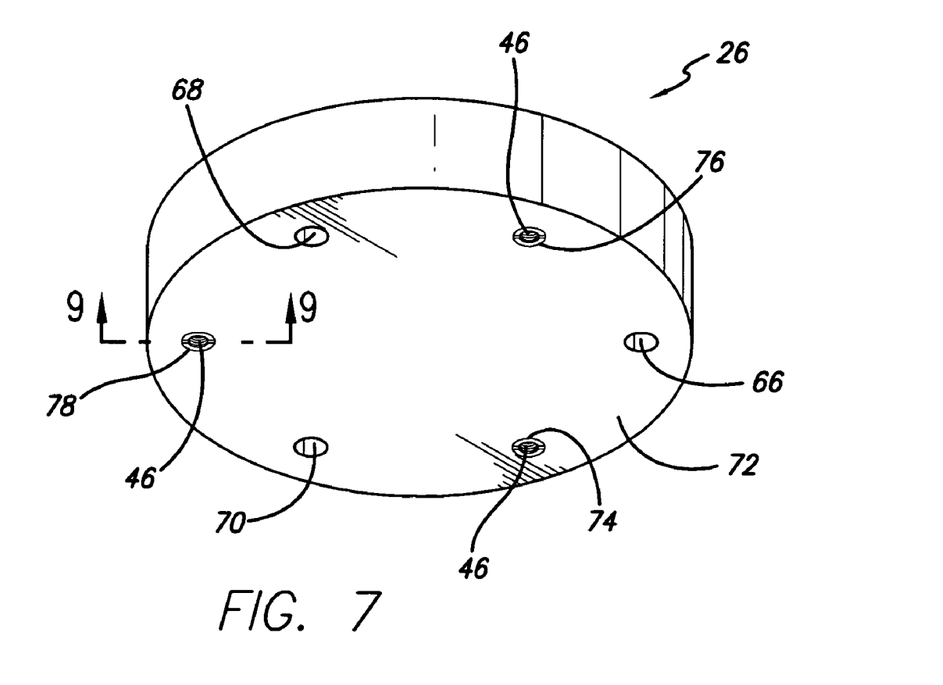
FIG. 7 is a bottom perspective view of the end cap of FIG. 6.
Figure 8:
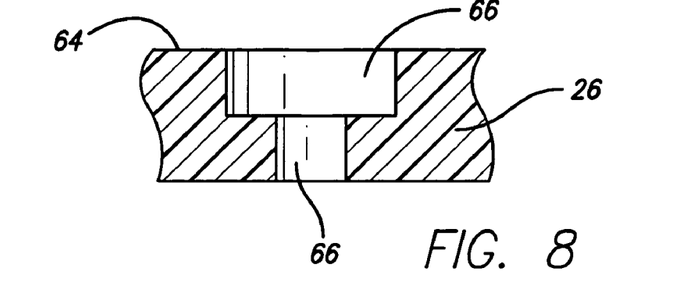
FIG. 8 is a cross-sectional view along section line 8-8 of FIG. 6.
Figure 9:
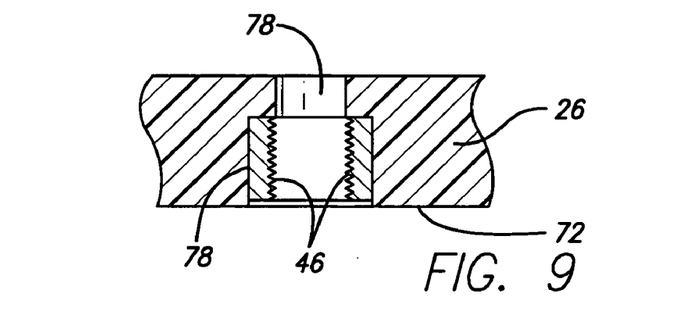
FIG. 9 is a cross-sectional view along section line 9-9 of FIG. 7.

End cap 26, which is substantially disc-shaped, seals the bottom end of modular manifold 20. Top surface 64 of end cap 26 includes three countersunk apertures 66, 68, 70 (FIG. 6) with each countersunk aperture being adapted to receive the head of long screw 36 (FIG. 1). Countersunk aperture 66 is shown in cross-section in FIG. 8. Bottom surface 72 of end cap 26 also includes three countersunk apertures, namely apertures 74, 76 and 78 (FIG. 7). Threaded female fastener 46 is embedded in each of countersunk apertures 74, 76, 78, as generally illustrated in FIG. 7. Embedded fastener 46 may lie flush with or somewhat below bottom surface 72, as needed. A female threaded fastener 46 embedded somewhat below bottom surface 72 in countersunk aperture 78 is shown in cross-section in FIG. 9. The alternating aperture arrangement on each surface (top and bottom) is accomplished generally in the manner described hereinabove in reference to FIGS. 2-3.

Front cap 22, port modules 24, spacer 21 and end cap 26 are generally of the same overall diameter and composition. For example, each of front cap 22, port modules 24, spacer 21 and end cap 26 may be made of strong, heat resistant and relatively lightweight materials such as PVC (Polyvinyl Chloride) or Delrin® plastics. Delrin® plastic is part of DuPont's engineered polymer line and is widely acclaimed as a lightweight but durable low wear, low friction plastic suitable for mechanical or electromechanical applications. Each manifold component may be cast into a mold and poured. Other materials or combinations of materials may be utilized, provided such other materials or material combinations do not depart from the intended purpose of the present invention.

Front cap 22, port modules 24, spacer 21 and end cap 26 are stacked on top of each other and fastened in the order generally illustrated in FIG. 1 during assembly of modular manifold 20. For example, port module 24 may be securely fastened to end cap 26 by inserting long screws 36 in top countersunk apertures 50, 52, 54 (of port module 24) and mating terminal ends 37 (FIG. 1) of screws 36 with female threaded fasteners 46 (FIG. 7) which are embedded in respective bottom countersunk apertures 74, 76, 78 (of end cap 26), as generally depicted in reference to FIGS. 1, 7. Screw 36 is of sufficient length to permit its terminal end 37 to securely mate with embedded fastener 46 via a respective narrow portion of bottom countersunk apertures 74, 76, 78 of end cap 26. The six apertures on each of front cap 22, port module 24, spacer 21 and end cap 26 are arranged in an alternating fashion, respectively, to allow fastening of the manifold components in the order generally shown in FIG. 1.

The apertures may be arranged differently on adjoining manifold components to allow for assembly of alternative manifold configurations. For example, a port module 80 may be configured with threaded female fasteners 46 that are embedded in bottom countersunk aperture positions 1, 3 and 5, while the terminal ends of the top countersunk apertures are disposed in positions 2, 4 and 6, respectively, as generally depicted in FIG. 11. An adjoining port module 82 with the same dimensions as port module 80 may be configured, for example, in reverse, i.e. with threaded fasteners 46 being embedded in bottom countersunk aperture positions 2, 4 and 6, while the terminal ends of the top countersunk apertures are disposed in positions 1, 3 and 5, respectively, as generally depicted in FIG. 12. Stacking and fastening multiple adjoining port modules 80, 82 consecutively between end and front caps (of the type generally described hereinabove in reference to FIGS. 1, 2-3 and 6-7) would result in a modular manifold assembly of the type generally shown in FIG. 10.

Figure 10:
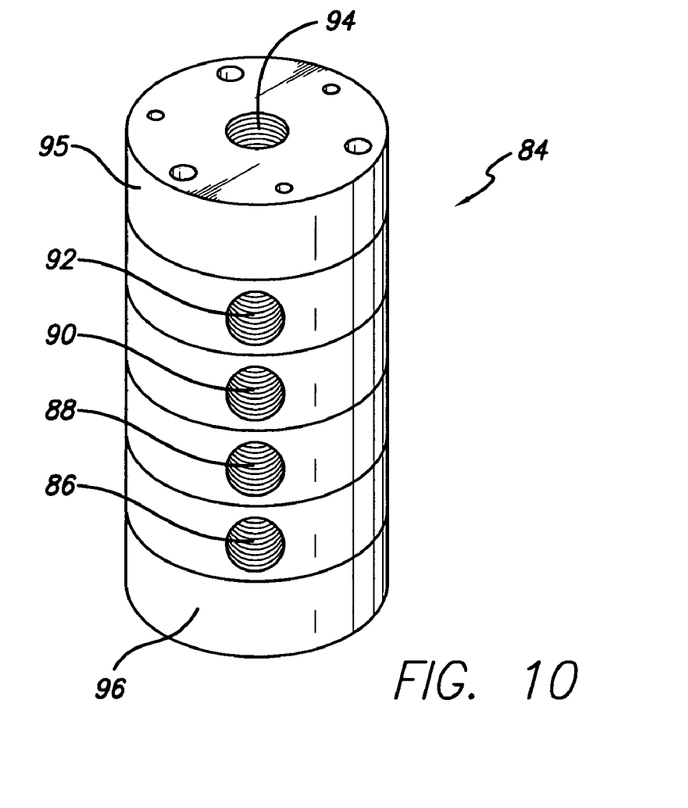
FIG. 10 is a front perspective view of a modular manifold in accordance with an alternative embodiment of the present invention.
Figure 11:
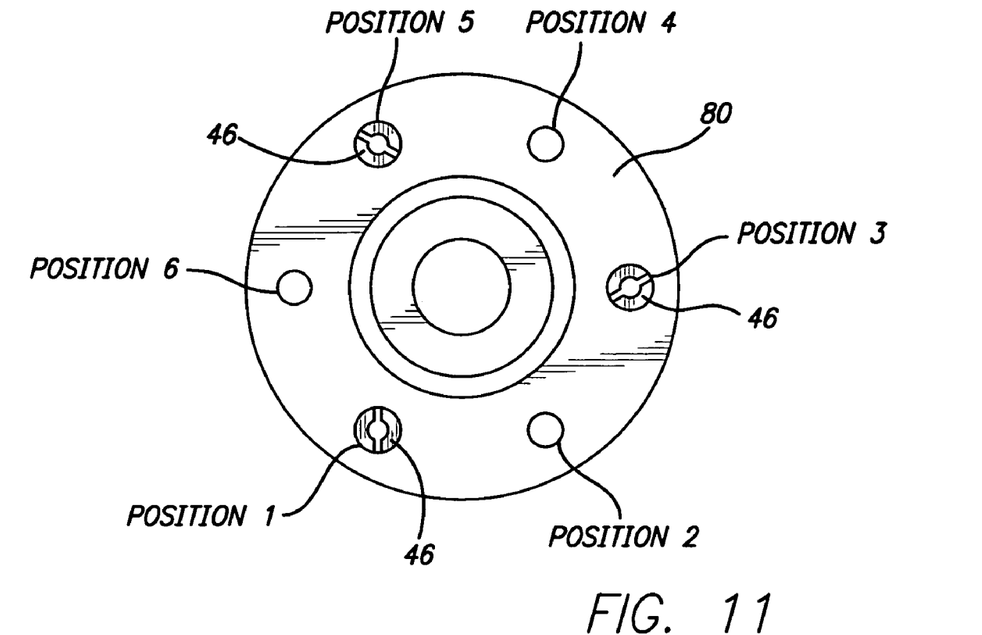
FIG. 11 is a bottom perspective view of a port module of the type being used in the modular manifold of FIG. 10.
Figure 12:
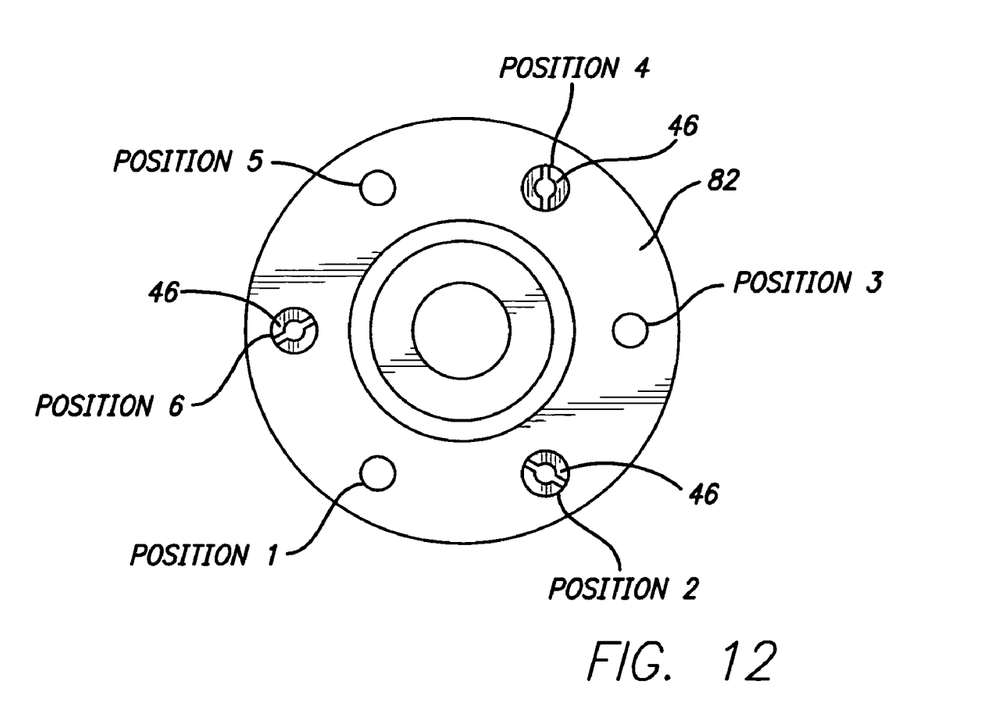
FIG. 12 is a bottom perspective view of a port module adjoining the port module of FIG. 11.

FIG. 10 generally depicts a modular manifold 84 having four stacked port modules whereby each pair of adjoining port modules employs the alternating aperture arrangement of port modules 80, 82 of FIGS. 11-12. Modular manifold 84 has four NPT threaded side ports 86, 88, 90 and 92 aligned in a substantially linear fashion. Modular manifold 84 is terminated with NPT threaded access 94 to a common manifold channel that is in communication with aligned side ports 86, 88, 90 and 92. Each NPT threaded side port permits one pipe, hose or valve to access the common manifold channel. The number of side ports may be varied by adding or subtracting manifold components, as needed. The common manifold channel, which is defined by the central channels of the stacked port modules, is sealed at the bottom by end cap 96 (FIG. 10).

Modular manifold 84 (FIG. 10) may be assembled sequentially by fastening the port module having side port 92 to front cap 95 via long screws and embedded fasteners of the type described hereinabove, followed by fastening the port module having side port 90 thereunder, followed by fastening the port module having side port 88 thereunder, followed by fastening the port module having side port 86 thereunder, and followed by fastening end cap 96 thereunder. Only one sealing O-ring is utilized between two adjoining port modules. Each manifold component, whether a spacer, end cap, front cap, or port module needs to have an O-ring on one side only. The selected side should face a side without an O-ring from the adjoining manifold component.

A person skilled in the art would readily appreciate that the number and size of aligned side ports, as well as the dimensions and shape of the stacked manifold components may be varied, as desired. For example, a port module may be made with ½ inch, ¾ inch or 1 inch NPT port size. Other port sizes may be employed, if necessary.

The head of long screw 36 may lie flush with or below the respective top surface of a manifold component, as needed, when terminal end 37 of long screw 36 is mated with female threaded fastener 46 that is embedded in an adjoining manifold component. The amount of recommended torque to tighten long screw 36 into fastener 46 during assembly of the modular manifold of the present invention may be supplied by the manifold manufacturer. Threaded fasteners 46 prevent accidental loosening of the manifold components and guarantee that the seal between adjoining components does not loosen by twisting and turning.

A person skilled in the art would readily appreciate that the modular manifold of the present invention may be assembled in other ways and/or with other suitable components and/or materials, as long as there is no departure from the intended purpose and scope of the present invention. The exemplary embodiments described hereinabove are merely illustrative of the general principles of the present invention. Various design modifications may be employed that would reside within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed:

1. A modular manifold, comprising:
   a first pair of adjoining port modules configured with a first internal channel adapted for fluid flow and two side ports arranged on top of each other, said side ports being in fluid communication with said first internal channel;
   a front cap operatively coupled to one side of said first pair of adjoining port modules, said operatively coupled front cap providing threaded access to said first internal channel;
   a second pair of adjoining port modules operatively coupled to another side of said first pair of adjoining port modules, said second pair of adjoining port modules configured with a second internal channel adapted for fluid flow and two side ports arranged on top of each other, said side ports being in fluid communication with said second internal channel,
   said first and second internal channels defining a common manifold channel, said side ports of said first and second pairs of adjoining port modules being aligned substantially in a linear fashion; and an end cap operatively coupled to said second pair of adjoining port modules and configured to seal said common manifold channel;
   wherein each of said first and second pairs of adjoining port modules includes top and bottom surfaces having first and second apertures arranged in an alternating fashion;
   wherein each of said first top surface apertures is configured as a countersunk aperture;
   wherein each of said second bottom surface apertures is configured as a countersunk aperture;
   wherein each of said second countersunk bottom surface apertures contains an embedded female fastener.

2. The modular manifold of claim 1, wherein each of said first top countersunk surface apertures is adapted to receive the head of a male fastener, said male fastener having a terminal end configured to mate with said embedded female fastener via the narrow portion of its countersunk bottom surface aperture, said embedded female fastener configured to prevent accidental manifold loosening by twisting and turning.

3. The modular manifold of claim 2, wherein each of said first and second pairs of adjoining port modules contains three countersunk bottom surface apertures and three narrow portions of countersunk top surface apertures.

4. The modular manifold of claim 3, wherein the disposition of said three countersunk bottom surface apertures and said three narrow portions is defined by aperture positions 1-6.

5. The modular manifold of claim 4, wherein one port module from said first pair of adjoining port modules is configured with three female fasteners embedded respectively in bottom countersunk aperture positions 1, 3 and 5.

6. The modular manifold of claim 5, wherein the other port module from said first pair of adjoining port modules is configured with three female fasteners embedded respectively in bottom countersunk aperture positions 2, 4 and 6.

7. The modular manifold of claim 4, wherein one port module from said second pair of adjoining port modules is configured with three female fasteners embedded respectively in bottom countersunk aperture positions 1, 3 and 5.

8. The modular manifold of claim 7, wherein the other port module from said second pair of adjoining port modules is configured with three female fasteners embedded respectively in bottom countersunk aperture positions 2, 4 and 6.

9. The modular manifold of claim 2, wherein the received head of said male fastener lies flush with a respective port module top surface.

10. The modular manifold of claim 2, wherein the received head of said male fastener lies below a respective port module top surface.

* * * * *